(12) United States Patent
Okuno et al.

(10) Patent No.: US 6,309,567 B1
(45) Date of Patent: Oct. 30, 2001

(54) COLLECTIVELY COATING DIE DEVICE FOR MANUFACTURING SEPARABLE OPTICAL FIBER RIBBON AND MANUFACTURING METHOD THEREOF

(75) Inventors: Kaoru Okuno; Ichiro Tsuchiya; Kohei Kobayashi; Tomoyuki Hattori; Ken Takahashi, all of Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/339,387

(22) Filed: Jun. 24, 1999

(30) Foreign Application Priority Data

Jun. 26, 1998 (JP) .................................................. 10-179860

(51) Int. Cl.⁷ .................................................. B29D 11/00
(52) U.S. Cl. .................... 264/1.27; 118/405; 118/420; 264/1.28; 264/1.38; 425/114; 425/174.4; 425/463; 427/163.2
(58) Field of Search .................... 264/1.1, 1.24, 264/1.28, 1.29, 1.27, 1.38; 427/163.2; 425/113, 114, 461, 462, 463, 174.4; 118/405, 420

(56) References Cited

U.S. PATENT DOCUMENTS

| | | | |
|---|---|---|---|
| 5,127,361 | * 7/1992 | Matsuda et al. | 427/163.2 |
| 5,486,378 | 1/1996 | Oestreich et al. | |
| 5,904,883 | * 5/1999 | Hattori et al. | 264/1.28 |
| 5,976,611 | * 11/1999 | Okuno et al. | 427/163.2 |
| 6,030,658 | * 2/2000 | Tsuchiya et al. | 427/163.2 |

FOREIGN PATENT DOCUMENTS

| | | |
|---|---|---|
| 0 841 582 | 5/1998 | (EP) . |
| 2-180733 | 7/1990 | (JP) . |
| 3-150510 | 6/1991 | (JP) . |
| 3-150519 | 6/1991 | (JP) . |

* cited by examiner

Primary Examiner—Mathieu D. Vargot
(74) Attorney, Agent, or Firm—McDermott, Will & Emery

(57) ABSTRACT

A collectively coating die device (2) is provided for applying coating resin in a lump to coated optical fibers (1) arranged in parallel on one and the same plane so as to form a plurality of optical fiber ribbons (16) at the same time. The collectively coating die device (2) has a nipple portion (9) and a die portion (10), a resin accumulation space (8) formed between the nipple portion (9) and the die portion (10). The nipple portion (9) has two parallel planes and having a plurality of optical fiber passageways (13) shaped like ellipses in section and provided in the direction perpendicular to the planes. The die portion (10) has two parallel planes and has a plurality of optical fiber passageways (14) shaped like ellipses in section and is provided in the direction perpendicular to the planes. Each of the optical fiber passageways (13) of the nipple portion (9) has a tapered portion. Each of the optical fiber passageways (14) of the die portion (10) is constituted by a tapered portion and a straight portion in order from an inlet opening side. The optical fiber passageways (14) of the die portion (10) is disposed so as to correspond to the optical fiber passageways (13) of the nipple portion (9) respectively through the resin accumulation space (8).

6 Claims, 6 Drawing Sheets

COLLECTIVELY COATING DIE DEVICE FOR MANUFACTURING SEPARABLE OPTICAL FIBER RIBBON AND MANUFACTURING METHOD THEREOF

BACKGROUND OF THE INVENTION

1. Field of the Invention

The present invention relates to manufacturing a plurality of optical fiber ribbons formed by applying coating resin in a lump to coated optical fibers arranged in parallel on one and the same plane, and a separable optical fiber ribbon formed by further integrally applying coating resin to the optical fiber ribbons arranged in parallel on one and the same plane. Particularly, the present invention relates to a collectively coating die device for manufacturing an optical fiber ribbon and a separable optical fiber ribbon, a manufacturing device having such a collectively coating die device for manufacturing a separable optical fiber ribbon, and a method of manufacturing such a separable optical fiber ribbon.

2. Description of the Conventional

Conventionally, to manufacture a separable optical fiber ribbon shown in FIG. 5A by way of example, constituted by a plurality of coated optical fibers are coated integrally, a die device having a branch portion 30a shown in FIG. 8 is known, as disclosed in Unexamined Japanese Patent Publication (kokai) No. Hei. 3-150519.

However, there is a problem in a method of manufacturing a separable optical fiber ribbon with such a die device having a branch portion as disclosed in the above-mentioned publication. That is, when the line speed increases, the arrangement of coated optical fibers 1 in a separable optical fiber ribbon 26 may fall into disorder as shown in FIG. 5C, and in some cases, there occur so-called fault of fiber planarity in the coated optical fibers 1 due to the displacement of the coated optical fibers 1 from the positions on one and the same plane on a large scale.

With such fault of fiber planarity, it becomes impossible to mount the coated optical fibers 1 of the separable optical fiber ribbon 26 onto V-grooves of a V-grooved board properly in an cable installation step or the like, so that it is difficult to connect the coated optical fibers 1 by fusion splice. Further, there is a fear that the fault of fiber planarity causes increase of transmission loss. It is therefore extremely important to suppress such fault.

Specifically, as shown in FIG. 6, the displacement $\Delta a - \Delta f$ of the center of each of the coated optical fibers 1 disposed in the separable optical fiber ribbon 26 relative to the straight line L connecting the respective centers of the coated optical fibers 1 disposed in both ends of the separable optical fiber ribbon 26 is referred to as a fiber planarity. It is necessary to make the respective fiber planaritys as small as possible.

Particularly, recently, the production technique has been improved so that the line speed is increased conspicuously. Therefore, the problem that fault of fiber planarity is increased has become manifest.

The present inventor investigated the cause of this problem and found out the following fact. In a step of manufacturing optical fiber ribbons, in a collective resin coating method using such a collectively coating die device having a branch portion 30a as shown in FIG. 8 by way of example, unstable vortex flows J of coating resin appear in the branch portion 30a in the direction reverse to the moving direction of the coated optical fibers 1 so as to disturb self-centering force generated in the coating resin in the collectively coating die device. Consequently, the fault of fiber planarity is increased.

Generally, when a linear body is passed through a die having a tapered portion and storing a liquid, a drag flow is generated in the liquid with the passage of the linear body. This drag flow makes a force to act on the linear body to dispose the linear body at the center of the die, that is, self-centering force.

Therefore, generally, when optical fibers pass through optical fiber passageways, respectively, of the collectively coating die device 2 filled with liquid-type coating resin, such self-centering force acts on the optical fibers so that the optical fibers are disposed at the center of an outlet opening 35.

The present inventor has found out the following fact. When the conventional collectively coating die device shown in FIG. 8 is used, a resin flow moving in the moving direction of the optical fibers collides with the branch portion 30a to generate unstable vortex flows J when the line speed of the optical fibers increases, and these vortex flows J disturb the self-centering force to cause the fault of fiber planarity. The present inventor has given light onto a structure of a die device which can eliminate such vortex flows to thereby achieve the present invention.

SUMMARY OF THE INVENTION

It is an object of the present invention to manufacture a separable optical fiber ribbon in which coated optical fibers are arranged on a plane with high accuracy.

The present invention provides a collectively coating die device for applying coating resin in a lump to coated optical fibers arranged in parallel on one and the same plane so as to form a plurality of optical fiber ribbons at the same time. In the coating die devices, the collectively coating die device comprises a nipple portion and a die portion, a resin accumulation space formed between the nipple portion and the die portion, each of the nipple portion and the die portion having two parallel planes and having a plurality of optical fiber passageways shaped like ellipse in section and provided in the direction perpendicular to the planes, each of the plural optical fiber passageways of the nipple portion having a tapered portion, each of the plural optical fiber passageways of the die portion being constituted by a tapered portion and a straight portion in order from an inlet opening side, the optical fiber passageways of the die portion being disposed so as to correspond to the optical fiber passageways of the nipple portion respectively through the resin accumulation space.

Further, the present invention provides an apparatus and a method for manufacturing an optical fiber ribbon and a separable optical fiber ribbon, which uses such a collectively coating die device.

According to a collectively coating die device of the present invention, also in the case of applying resin to coated optical fibers at a high line speed, it is possible to reduce fiber planaritys of optical fibers in the optical fiber ribbons conspicuously. As a result, the coated optical fibers could be mounted on V-grooves of a V-grooved board accurately without any problem at the time of connection of the coated optical fibers of the separable optical fiber ribbon by fusion splice. Further, it is possible to avoid increase of transmission loss caused by fault of fiber planarity.

Further, the productivity of a separable optical fiber ribbon can be improved by using a collectively coating die device according to the present invention, so that it is possible to obtain an effect to reduce the manufacturing cost.

DETAILED DESCRIPTION OF THE DRAWINGS

An embodiment of the present invention will be described below with reference to the accompanying drawings. The same portions are referenced correspondingly, and duplicate description thereof is omitted.
(Collectively coating Die device)

Figure 1A:
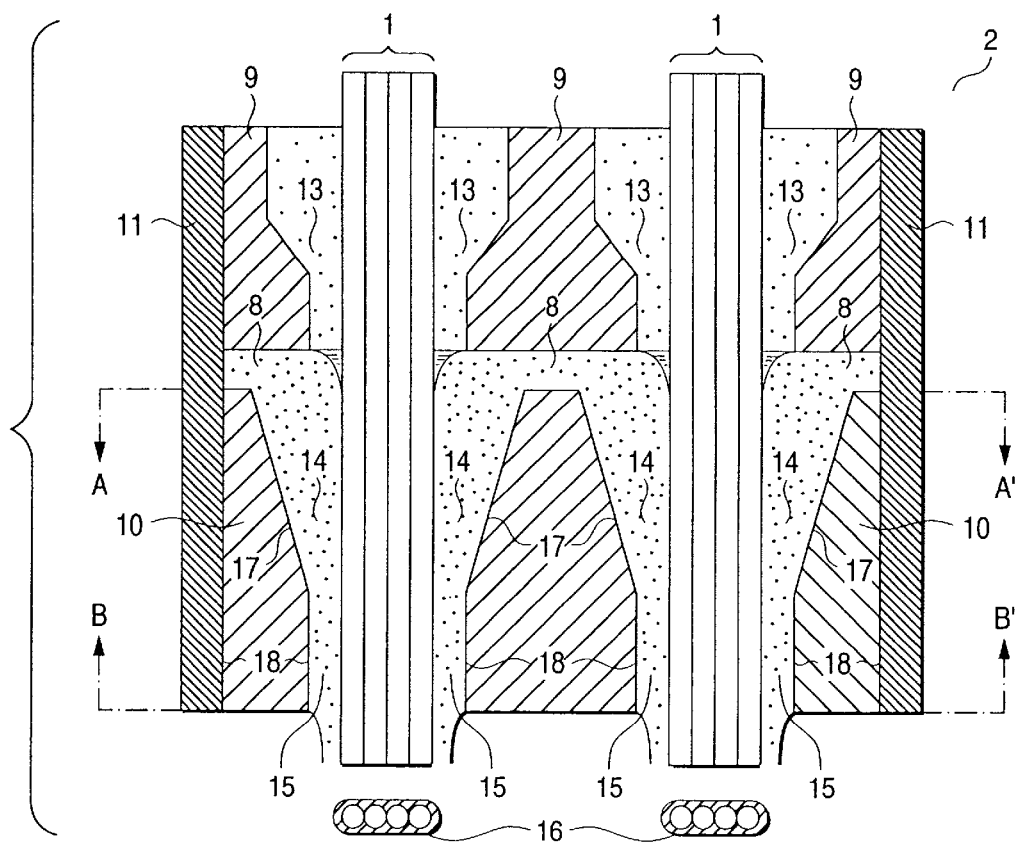
FIG. 1A is a longitudinally sectional view illustrating a structure of a collectively coating die device of the present invention.

A longitudinally sectional view of a collectively coating die device 2 of an embodiment according to the present invention is shown in FIG. 1A. In the following description, the moving direction of coated optical fibers 1 in optical fiber passageways 13 and 14 is referred to as a longitudinal direction, while the direction perpendicular to the moving direction of the coated optical fibers 1 is referred to as a transverse direction.

Figure 1B:
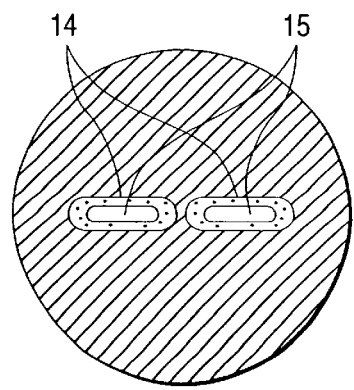
FIG. 1B is a sectional view of the collectively coating device viewed from an inlet of a die portion toward an outlet thereof.
Figure 1C:
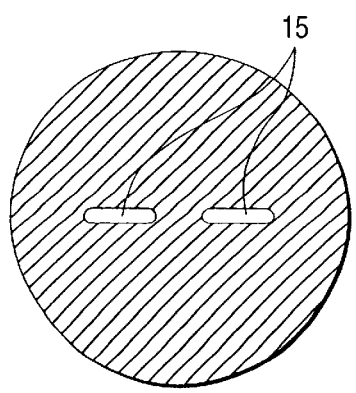
FIG. 1C is a sectional view of the collectively coating device viewed from the outlet of the die portion toward the inlet thereof.

As for the optical fiber passageway 14 of a die portion 10 of this unit 2, FIG. 1B shows a sectional view taken on line A–A' from the inlet opening side toward the outlet opening side, and FIG. 1C shows a sectional view taken on line B–B' and viewed from the outlet opening side toward the inlet opening side, conversely.

The collectively coating die device 2 which is an embodiment of the present invention has a cylindrical shape as a whole, as is apparent from FIGS. 1B and 1C. In the collectively coating die device 2, a nipple portion 9 is provided on the inlet side, and the die portion 10 is provided on the outlet side. These portions are fixed to a cylindrical sleeve 11 so that a resin accumulation space 8 is formed between the nipple portion 9 and the die portion 10. Each of the die portion 10 and the nipple portion 9 has a flange portion so that they are fixed to the cylindrical sleeve 11. A plurality of optical fiber passageways 13 and 14, each which has a shape like a ellipse in section, are formed to penetrate this cylindrical collectively coating die device in the longitudinal direction.

Further, in this collectively coating die device 2, the resin accumulation space 8 is formed to communicate with a not-shown coating resin supply portion.

Generally, the optical fiber passageways in the die portion 10 and the nipple portion 9 of this collectively coating die device 2 are made of finely finishing a metal material by means of an electrical discharge machining method.
(Optical Fiber Passageway)

Each of the optical fiber passageways 13 and 14 has a transverse section like a flat ellipse. That is, corresponding to the shape of the coated optical fibers 1 arranged on one and the same plane to be resin-coated, each passageway is constituted by a pair of straight portions (hereinafter simply referred to as long side portions) parallel to this plane, and curved portions (hereinafter simply referred to as short side portions) disposed in positions opposing to each other through these straight portions.

As seen in FIGS. 1B and 1C, each of the above-mentioned optical fiber passageways 14 is arranged so that the long side portions of the ellipse-like shape thereof are parallel with a plane containing central axes Z (see FIG. 2) of the respective optical fiber passageways each of which passes the center of an outlet opening 15 of the optical fiber passageway.

Further, it is preferable that each of the short side portions of the ellipse-like shape of the optical fiber passageway 14 is formed such that the surface thereof is not angular but round at any portion so as to have a radius of curvature as large as possible in order to avoid disturbance of flow of resin. For example, it is typical to shape the surface to be semi-circular, a semi-ellipsoidal, or the like.

The optical fiber passageways 13 of the nipple portion 9 are formed similarly.

Further, the transversely sectional area of the tapered portion of each of the optical fiber passageways 14 of the die portion 10 is reduced in the moving direction of optical fibers, that is, in the direction toward the outlet. On the other hand, the sectional area of the straight portion of the optical fiber passageway 14 is constant, and an inlet portion of the straight portion is continued to the terminal portion of the tapered portion.

The tapered portion of the optical fiber passageway 13 of the nipple portion 9 is formed similarly.
(Nipple Portion)

The nipple portion 9 has a plurality of optical fiber passageways 13, as shown in FIG. 1A by way of example.

Straight and tapered portions on the inlet opening side of the nipple portion 9 have a guide function to make it easy to insert optical fibers. Alternatively, the nipple portion 9 may have a structure where the straight portions on the inlet opening side are omitted.
(Die Portion)

In the die portion 10, each of the optical fiber passageways 14 is constituted by a tapered portion 17 on the inlet opening side and a straight portion 18 on the outlet opening side, and each of the optical fiber passageways 14 has a transverse section like a ellipse constituted by long side portions and short side portions. A central axis Z of the optical fiber passageway 14 coincides with the central axis of the corresponding optical fiber passageway 13 of the nipple portion 9.

The die portion 10 has a function to arrange the coated optical fibers 1 in order by self-centering force, and a function to apply resin coating in a lump onto the coated optical fibers 1 arranged on one and the same plane. In this case, in view of mounting the coated optical fibers 1 on V-grooves accurately to connect them by fusion splice properly, it is extremely important to arrange the coated optical fibers 1 on one and the same plane accurately so as to generate no fault of fiber planarity. This is important also in view of avoiding increase of transmission loss in optical fiber due to fault of fiber planarity.

(Structure of the Die Portion)

Figure 8A:
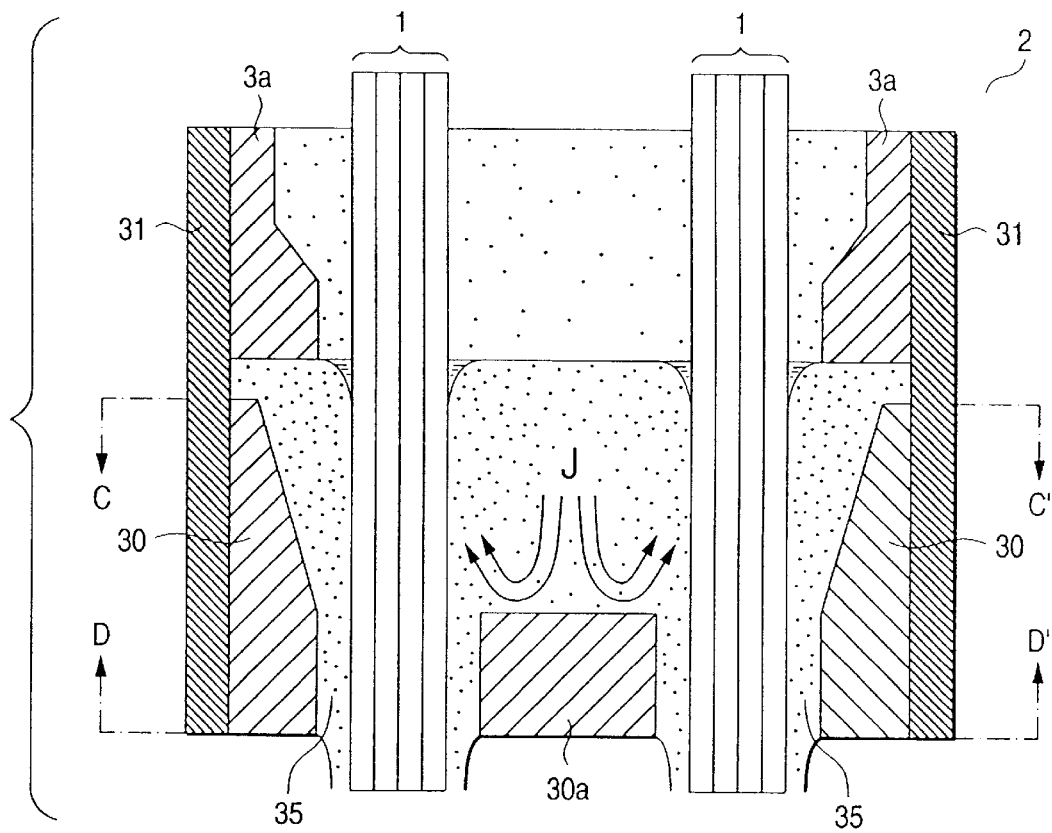
FIG. 8A is a longitudinally sectional view illustrating a structure of a conventional collectively coating die device.
Figure 8B:
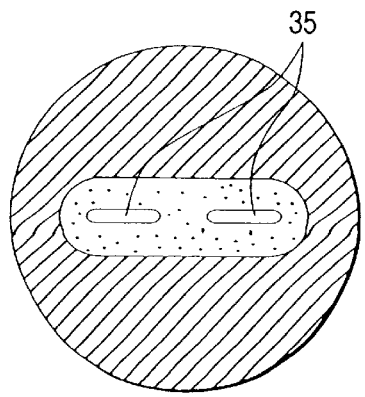
FIG. 8B is a sectional view of the conventional collectively coating die device.
Figure 8C:
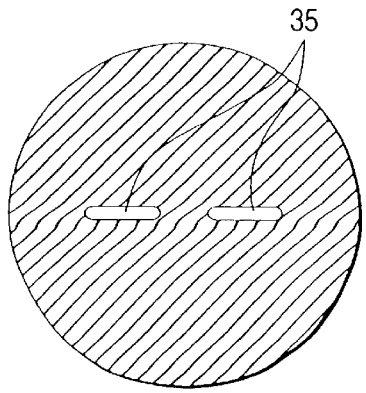
FIG. 8C is a sectional view of the conventional collectively coating die device viewed from the outlet of the die portion toward the inlet thereof.

The die portion 10, which is a main constituent of the present invention, has a die structure in which the branch portion 30a of the conventional collectively coating die device 2 supposing the conventional line speed and shown in FIG. 8 is excluded so that no vortex flow J of resin between the optical fiber passageways caused by this branch portion 30a is produced even when optical fibers are coated with resin at a high line speed. Consequently, it has become possible to conspicuously suppress the size of fiber planarity of the coated optical fibers 1 even at a high speed.

Figure 2:
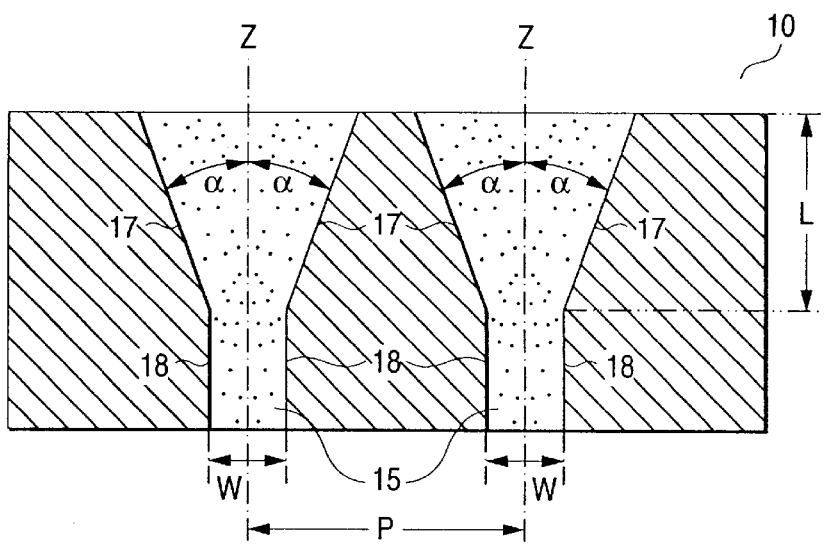
FIG. 2 is a longitudinally sectional view illustrating a structure of a symmetrical die portion of a collectively coating die device of the present invention.

That is, as for the structure of the die portion 10, as is apparent from FIGS. 1A and 2, the optical fiber passageways 14 have the same structure. Each of the optical fiber passageways 14 is constituted by a tapered portion 17 on the inlet opening side and a straight portion 18 on the outlet opening 15 side. Each of the optical fiber passageways 14 has a transversely section like a ellipse constituted by short side portions and long side portions.

Particularly, the tapered portion 17 of each of the optical fiber passageways 14 of the die portion 10 satisfies the relation of $P-W-2L \times \tan\alpha \geq 0$, where L designates the whole length of the tapered portion 17 (hereinafter simply referred to as taper length), P designates a distance between the central axes Z of the respective optical fiber passageways 14, W designates the length of each of the outlet openings 15 in the direction of the long side portion, and a designates one of equal taper half angles when adjacent taper half angles through a wall portion is equal to each other in a cross section including the axis Z.

Figure 3A:
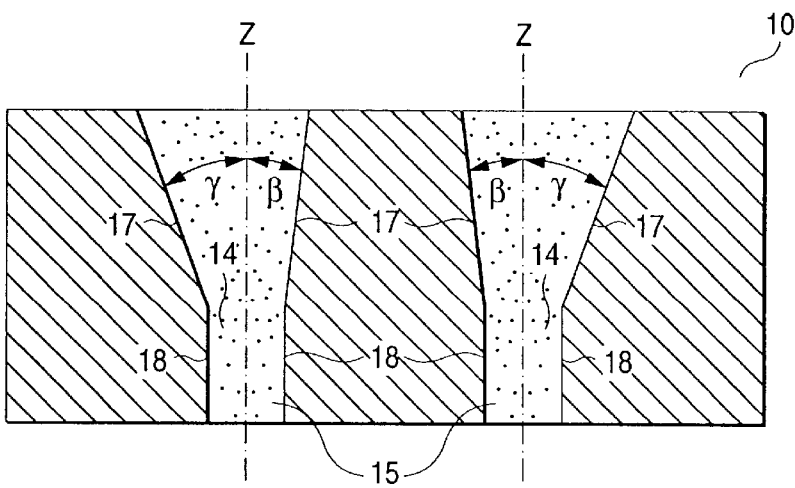
FIG. 3A is a longitudinally sectional view of an asymmetrical die portion of another collectively coating die device of the present invention.
Figure 3B:
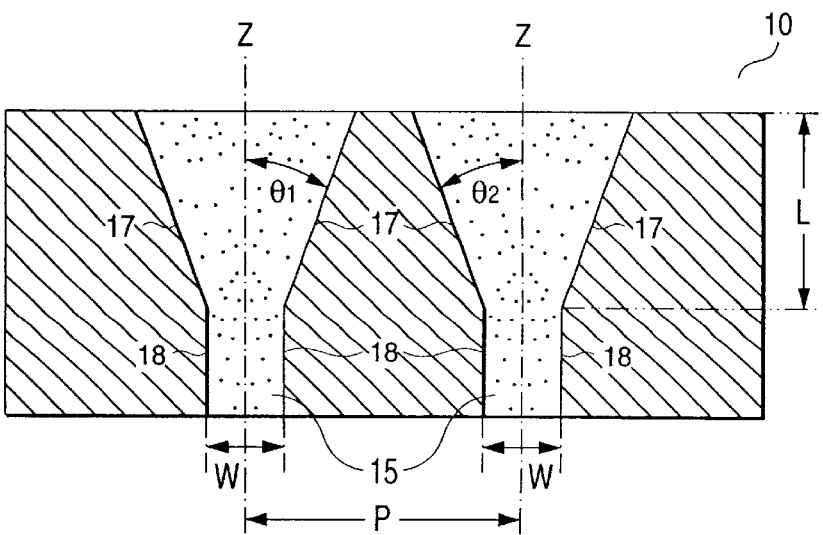
FIG. 3B is a longitudinally sectional view of a general die portion including a symmetrical type and an asymmetrical type, and for explaining reference numerals of respective portions.

Generally, as shown in FIG. 3B, the tapered portions adjacent to each other through the wall portion of the optical fiber passageway 14 satisfy the relation of $P-W-L \times (\tan\theta_1 + \tan\theta_2) \geq 0$ where $\theta_1$ and $\theta_2$ designate different taper half angles which are adjacent taper half angle through the wall portion in the cross section including the axis Z. Hereinafter, they may be called "taper half angles of short side".

If the distance P between the central axes Z of the optical fiber passageways 14 is made too large, it is not preferable because the die device 2 itself increases in size. In addition, there is a fear that a transverse tension acts on the coated optical fibers 1 between the die device 2 and the integrally coating die device 3. As a result, the coated optical fibers 1 contact with the outlet openings 15 of the die device 2 so that the resin coatings for the coated optical fibers 1 are deformed. Therefore, it is preferable to set the distance P to be within a range of $0.5\ mm < P \leq 10\ mm$.

It is preferable to set the taper length L to be within a range of $2\ mm \leq L \leq 10\ mm$. It is preferable to set the taper half angle $\alpha$ to be within a range of $1° \leq \alpha \leq 10°$ in view of self-centering force.

(Collectively coating Die device with Asymmetrical Taper Half Angles)

Figure 6:
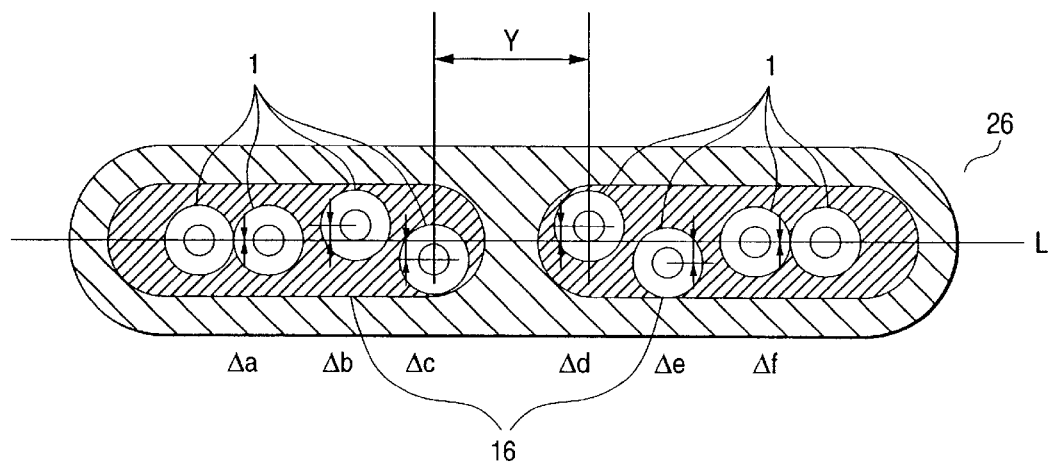
FIG. 6 is a cross-sectional view illustrating a state where optical fibers are arranged in order in an optical fiber ribbon.

If a distance Y between adjacent coated optical fibers 1 of the respective optical fiber ribbons 16 included in a separable optical fiber ribbon 26 (see FIG. 6) is too large, there arises a problem that a portion of the coated optical fibers 1 in the separable optical fiber ribbon 26 comes out of a V-groove on a V-grooved board at the time of fusion splicing the coated optical fibers 1. Accordingly, it becomes impossible to perform the working of fusion splice.

Figure 5A:
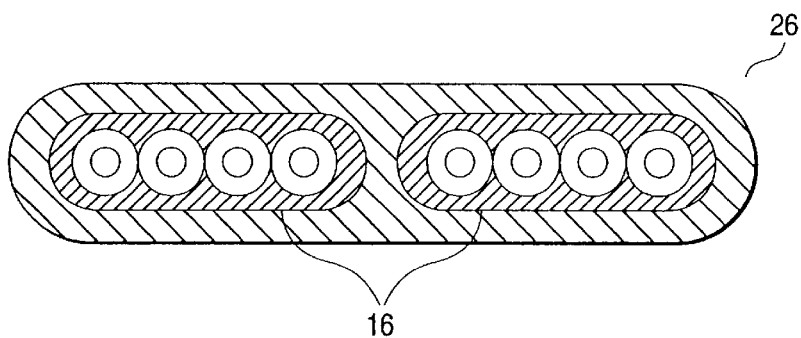
FIGS. 5A to 5C are cross-sectional views illustrating a structure of a separable optical fiber ribbon.
Figure 5B:
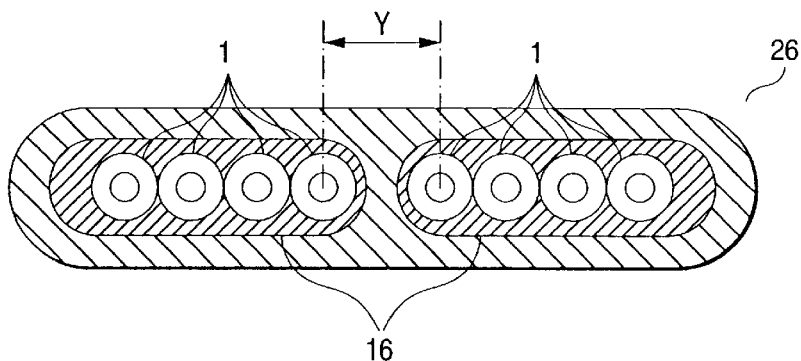

When it is necessary to use a separable optical fiber ribbon 26 with the shortened distance Y, a die device 2 having such a die portion 10 with asymmetrical taper half angles as shown in FIG. 3A is used for manufacturing such a separable optical fiber ribbon 26. Accordingly, the coated optical fibers 1 included in adjacent optical fiber ribbons 16 in the separable optical fiber ribbon 26 may be brought into inner sides respectively so as to be made closer to each other as shown in FIG. 5B by way of example.

That is, as shown in FIG. 3A, if the die portion 10 has two optical fiber passageways 14 and has an asymmetrical die portion and, of different taper half angles at a portion defined by short side portions and intersected by a plane including the center axes Z of the optical fiber passageways 14, an outside angle $\gamma$ and an inside angle $\beta$ satisfy the relation of $\gamma > \beta$, the balance of self-centering force in the optical fiber passageway 14 is shifted to the inside. As shown in FIG. 5B, therefore, when such a die portion 10 is used, the respective coated optical fibers 1 in the two optical fiber ribbons 16 are shifted to the inside mutually. Accordingly, it is possible to manufacture a separable optical fiber ribbon 26 having an optimum distance Y between adjacent inside coated optical fibers 1 in the adjacent optical fiber ribbons 16.

(Apparatus for Manufacturing a Separable Optical Fiber Ribbon)

Figure 7:
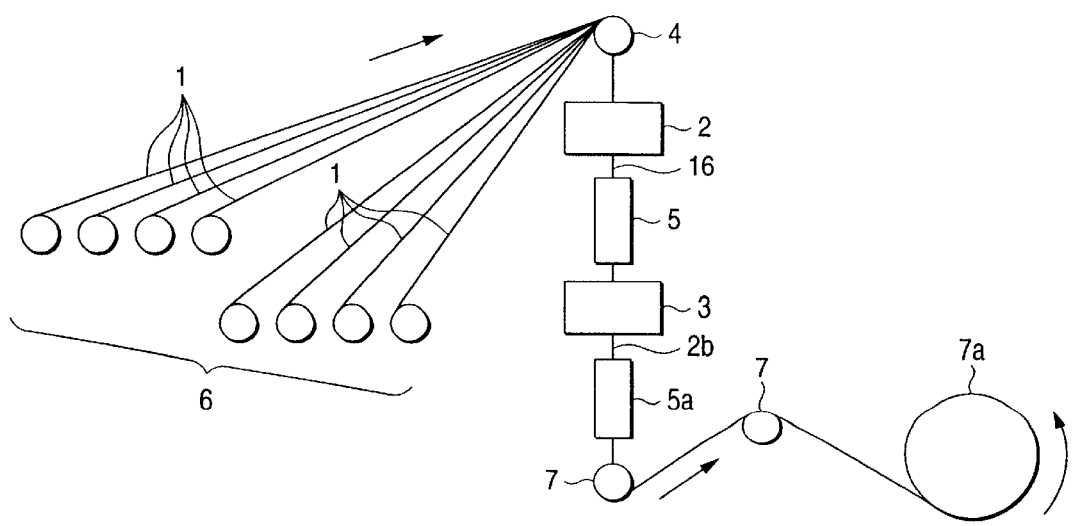
FIG. 7 is a view illustrating an apparatus for manufacturing a separable optical fiber ribbon.

As shown in FIG. 7, an apparatus for manufacturing a separable optical fiber ribbon 26 is constituted by an optical fiber supply 6, a line concentration roller 4, a collectively coating die device 2, ultraviolet curing devices 5 and 5a, an integral coating die device 3, turn rollers 7, and a take-up machine 7a.

Although the steps from the line concentration roller 4 to the turn roller 7 are disposed vertically in the example shown in FIG. 7, the present invention is not limited thereto. The collectively coating die device 2 and the ultraviolet curing device 5, and the integrally coating die device 3 and the ultraviolet curing device 5a must be arranged in the same direction respectively, but the other steps may be disposed in desired directions.

The optical fiber supply 6 is constituted by reels having the coated optical fibers 1 taken-up thereon. The reels are prepared by the number equal to the number of coated optical fibers 1 included in each optical fiber ribbon 16 formed in an intermediate step.

The line concentration roller 4 is a roller having a function to arrange a plurality of coated optical fibers 1 supplied from the optical fiber supply 6 on one and the same plane, and to change the direction of supply of the coated optical fibers 1 so as to supply those coated optical fibers 1 to the collectively coating die device 2 in the next step.

The structure and function of the collectively coating die device 2 have been already described in detail. The collectively coating die device 2 is a device for coating the group of optical fibers with resin in a lump so that the group of optical fibers are arranged on one and the same plane so as to form a plurality of optical fiber ribbons 16.

The ultraviolet curing device 5 is a device for radiating ultraviolet rays onto the optical fiber ribbons 16 coated with resin in a lump in the collectively coating die device 2, thereby ultraviolet curing the resin coating.

Figure 4:
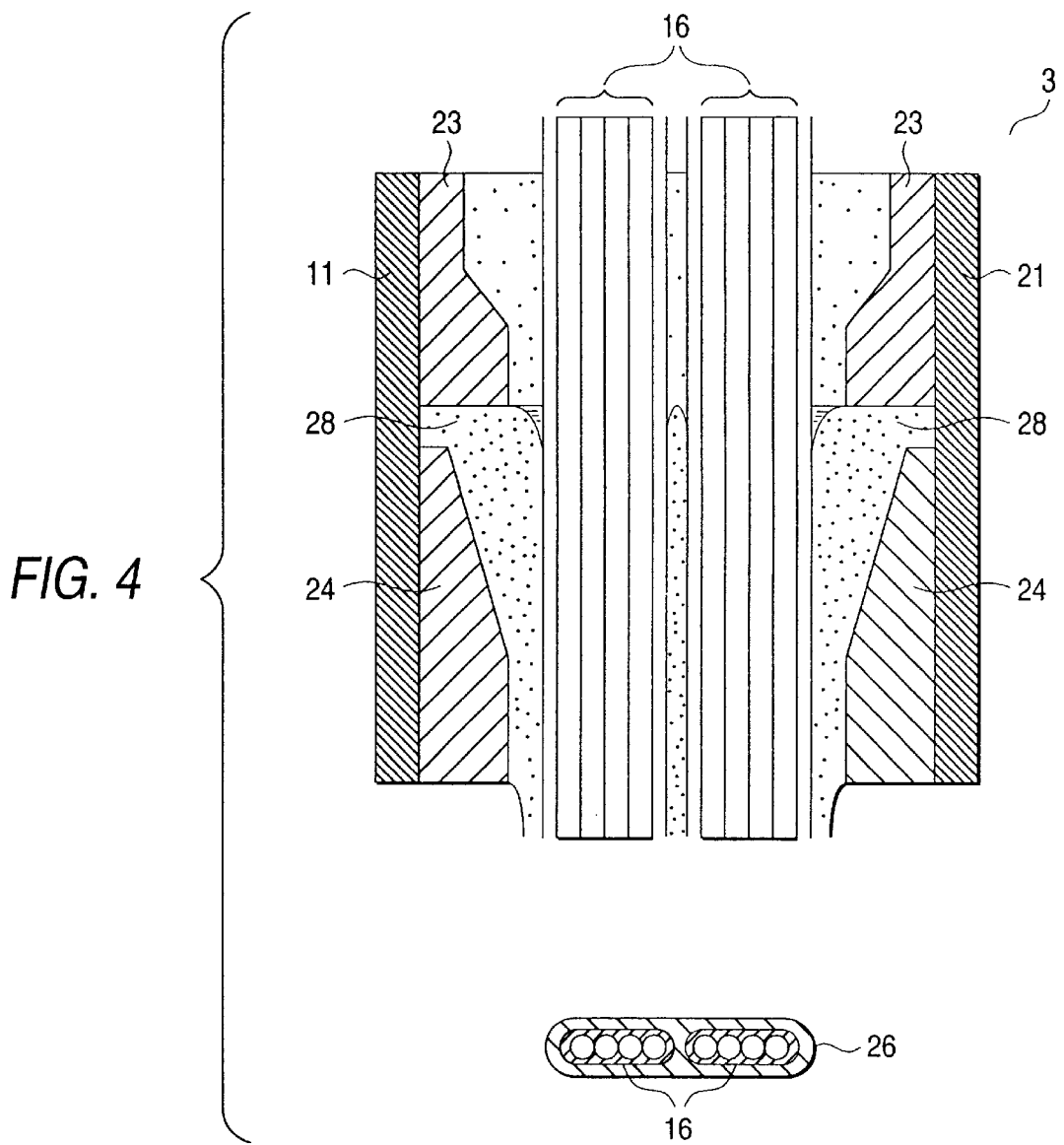
FIG. 4 is a longitudinally sectional view illustrating a structure of an integrally coating die device of the present invention.

The integrally coating die device 3 is an apparatus for integrally applying resin to the optical fiber ribbons 16 arranged on one and the same plane so as to form a separable optical fiber ribbon 26, as shown in FIG. 4.

As for the structure of the integrally coating die device 3, a nipple portion 23 is provided on the inlet side, and a die portion 24 is provided on the outlet side. These portions are fixed to each other by a sleeve 21 so that a resin accumulation space 28 is formed between the nipple portion 23 and the die portion 24. Further, in this integrally coating die device 3, the resin accumulation space 28 communicates with a not-shown coating resin supply portion.

The structure and function of the nipple portion 23, the resin accumulation portion 28 and the die portion 24 are similar to those of the nipple portion 9, the resin accumulation portion 8 and the die portion 10 of the collectively coating die device 2. But the integrally coating die device 3 is characterized in that only one optical fiber passageway is provided, the size as a whole is large, and, particularly, the longitudinal length of the outlet opening of the die portion 24 becomes long in accordance with the number of the coated optical fibers 1 in the optical fiber ribbon 16 passing through the outlet opening.

The ultraviolet curing device 5a is a device for radiating ultraviolet rays onto the separable optical fiber ribbon 26 integrally coated with resin, thereby ultraviolet curing the coating resin.

The turn rollers 7 are rollers for keeping the transverse position of the separable optical fiber ribbon 26 passed through the ultraviolet curing device 5a, and changing the direction of movement of the separable optical fiber ribbon 26 toward the winding machine 7a.

The take-up machine 7a is an apparatus for taking-up the separable optical fiber ribbon 26 on a bobbin.

EXAMPLES

Example 1

Using a collectively coating die device 2 having a symmetrical die portion 10, with a taper half angle $\alpha=8°$, a taper length L=8 mm, and a distance between central axes P=4 mm.

By means of the above-mentioned apparatus for manufacturing the separable optical fiber ribbon 26, manufactured was a separable optical fiber ribbon 26 about 2.2 mm wide and about 0.33 mm thick, having two 4-fiber ribbon 16 about 1.05 mm wide and about 0.31 mm thick as sub-units each including four coated optical fibers 1.

First, eight coated optical fibers 1 in total, each of which had an outer diameter of 250 μm and each of which had a primary coating layer, a secondary coating layer and a colored layer coated in order on a glass layer, were supplied to the line concentration roller 4 so as to form a group of optical fibers arranged on one and the same plane. The direction of supply of the group of optical fibers were changed so that they were supplied to the collectively coating die device 2 at a line speed of 300 m/min.

In the collectively coating die device 2, ultraviolet curing resin having viscosity of 2,500 cps was supplied so as to form at the same time two optical fiber ribbons 16 each of which was constituted by four coated optical fibers 1.

The collectively coating die device 2 used here had a nipple portion 9 and a die portion 10 having two ellipse-like optical fiber passageways 13 and 14 respectively.

In each of the optical fiber passageways 13, a straight portion, a tapered portion and another straight portion were formed in order from an inlet opening side.

A resin accumulation space 8 was provided between the nipple portion 9 and the die portion 10.

The die portion 10 used here had the symmetrical tapered portions 17 as shown in FIG. 2 by way of example. In each of the optical fiber passageways 14, a tapered portion 17 and a straight portion 18 were formed in order from the inlet opening side. The distance P between the central axes Z of the optical fiber passageways was 4 mm. The length W in the long side of the outlet opening 15 of each optical fiber passageway was 1.2 mm, and the width in the short side was 0.32 mm. Each of the short side portions of the transverse section was semi-circular. The taper length L of each taper portion 17 was 8 mm, and the taper half angle α of the short side portion was 8°.

The two optical fiber ribbons 16 coated in a lump were passed through the ultraviolet curing device 5 so as to be cured by irradiation with ultraviolet rays. Then, passed through the integrally coating die device 3, the two optical fiber ribbons 16 arranged on one and the same plane were coated with ultraviolet curing resin integrally at the same time. Thus, a separable optical fiber ribbon 26 was manufactured.

The integrally coating die device 3 used here had a nipple portion 23 and a die portion 24 each of which had one ellipse-like optical fiber passageway.

In the optical fiber passageway of the nipple portion 23, a straight portion, a tapered portion and another straight portion were formed in order from the inlet opening side.

A resin accumulation space 28 was formed between the nipple portion 23 and the die portion 24. In the optical fiber passageway of the die portion 24, a tapered portion and a straight portion were formed in order from the inlet opening side. The taper half angle of the short side portion was 1.5°. The width in the long side of the outlet opening was 2.3 mm and the width in the short side was 0.34 mm.

The separable optical fiber ribbon 26 coated integrally was passed through the ultraviolet curing device 5a so as to be cured by irradiation with ultraviolet rays. After turned by a turn roller 7, the separable optical fiber ribbon 26 was taken up by a take-up machine 7a.

Thus, manufactured was a separable optical fiber ribbon 26 which was 2.2 mm wide and 0.33 mm thick and which had two 4-fiber ribbons 16 which was 1.05 mm wide and 0.31 mm thick as sub-units each including 4 coated optical fibers 1. The cross-section of the separable optical fiber ribbon 26 is typically shown in FIG. 5A.

Each of fiber planaritys Δa to Δf (see FIG. 6) of the coated optical fibers 1 included in this separable optical fiber ribbon 26 were sufficiently small to be within a range of from 5 μm to 17 μm. The eight coated optical fibers 1 which the coating layers were removed in the end portions of the separable optical fiber ribbon so that coated optical fibers could be mounted on V-grooves of a V-grooved board with no problem, so that no trouble occurred at the time of connection by fusion splice. Further, the increase of transmission loss in the respective coated optical fibers 1 of this optical fiber ribbon was measured. As a result, any increase of transmission loss caused by the above-mentioned fiber planaritys was not recognized.

Example 2

Using a collectively coating die device 2 having a symmetrical die portion 10, with a taper half angle $\alpha=4°$, a taper length L=7 mm, and a distance between the central axes P=3 mm By means of a collectively coating die device 2 having such a symmetrical die portion 10 as shown in FIG. 2 by way of example, a separable optical fiber ribbon 26 was manufactured under the conditions that the taper half angle α of the short side portion of a taper portion 17 of this die portion 10 was 4°, the taper length L was 7 mm, the distance P between the central axes Z of the optical fiber passageways was 3 mm, and the other portions had the same conditions as those in the above-mentioned Example 1. The cross-section of the separable optical fiber ribbon 26 is typically shown in FIG. 5A.

Each of fiber planaritys Δa to Δf of coated optical fibers 1 included in the manufactured separable optical fiber ribbon 26 was sufficiently small to be within a range of from 8 μm to 19 μm. The respective coated optical fibers 1 could be mounted on V-grooves of a V-grooved board with no trouble, so that no trouble occurred at the time of connection by fusion splice. Further, the increase of transmission loss of the respective coated optical fibers 1 of this optical fiber ribbon was measured. As a result, any increase in transmission loss caused by the above-mentioned fiber planaritys was not recognized.

Example 3

Using a collectively coating die device 2 having a symmetrical die portion 10, with a taper half angle α=1.5°, a taper length L=4 mm, and a distance between the central axes P=2 mm By means of a collectively coating die device 2 having such a symmetrical die portion 10 as shown in FIG. 2, a separable optical fiber ribbon 26 was manufactured under the conditions that the taper half angle α of the short side portion of a taper portion 17 of this die portion 10 was 1.5°, the taper length L was 4 mm, the distance P between the central axes Z of the optical fiber passageways was 2 mm, and the other portions had the same conditions as those in the above-mentioned Example 1. The cross-section of the separable optical fiber ribbon 26 is typically shown in FIG. 5A.

Each of fiber planaritys Δa to Δf included in the manufactured separable optical fiber ribbon 26 was sufficiently small to be within a range of from 3 μm to 12 μm. The respective coated optical fibers 1 could be mounted properly on V-grooves of a V-grooved board with no trouble, so that no trouble occurred at the time of connection by fusion splice. Further, the increase of transmission loss of the respective coated optical fibers 1 of this optical fiber ribbon was measured. As a result, any increase in transmission loss caused by the above-mentioned fiber planaritys was not recognized.

Example 4

Using a collectively coating die device 2 having an asymmetrical die portion 10, with a taper half angle β=1.5°, another taper half angle γ=3°, a taper length L=4 mm, and a distance between the central axes P=2 mm By means of a collectively coating die device 2 having an asymmetrical die portion 10 shown in FIG. 3A by way of example, a separable optical fiber ribbon 26 was manufactured under the conditions that, of the taper half angles of short side portions of this die portion 10, the inner side taper half angle β was 1.5°, and the outer side taper half angle γ was 3°, the taper length L was 4 mm, the distance P between the central axes Z of the optical fiber passageways was 2 mm, and the other portions had the same conditions as those in the above-mentioned Example 1. The cross-section of the separable optical fiber ribbon 26 is typically shown in FIG. 5B.

Distance Y between the two adjacent coated optical fibers 1 each of which was respectively in the optical fiber ribbons 16 in the manufactured separable optical fiber ribbon 26 was sufficiently small to be 290 μm. All the eight coated optical fibers 1 could be mounted on V-grooves of a V-grooved board with a margin without coming out from the V-grooves.

Each of fiber planaritys Δa to Δf included in the manufactured separable optical fiber ribbon 26 was sufficiently small to be within a range of from 6 μm to 13 μm. The respective coated optical fibers 1 could be mounted properly on V-grooves of a V-grooved board with no trouble, so that no trouble occurred at the time of connection by fusion splice. Further, the increase of transmission loss of the respective coated optical fibers 1 of this optical fiber ribbon was measured. As a result, any increase in transmission loss caused by the above-mentioned fiber planaritys was not recognized.

Example 5

Using a collectively coating die device 2 having an asymmetrical die portion 10, with a taper half angle β=4°, another taper half angle γ=8°, a taper length L=5 mm, and a distance between the central axes P=2.5 mm By means of a collectively coating die device 2 having an asymmetrical die portion 10 shown in FIG. 3A by way of example, a separable optical fiber ribbon 26 was manufactured under the conditions that, of the taper half angles at a portion defined by the short side portions of the tapered portion 17 of this die portion 10 and intersected by a plane including the central axes Z of the optical fiber passageways, the inner side taper half angle β was 4°, and the outer side taper half angle γ was 8°, the taper length L was 5 mm, the distance P between the central axes Z of the optical fiber passageways was 2.5 mm, and the other portions had the same conditions as those in the above-mentioned Example 1. The cross-section of the separable optical fiber ribbon 26 is typically shown in FIG. 5B.

Distance Y between the adjacent coated optical fibers 1 in the optical fiber ribbons 16 in the manufactured separable optical fiber ribbon 26 was sufficiently small to be 300 μm. All the eight coated optical fibers 1 could be mounted on v-grooves of a V-grooved board with a margin without coming out from the V-grooves.

Each of fiber planaritys Δa to Δf included in the manufactured separable optical fiber ribbon 26 was sufficiently small to be within a range of from 7 μm to 16 μm. The respective coated optical fibers 1 could be mounted properly on V-grooves of a V-grooved board with no trouble, so that no trouble occurred at the time of connection by fusion splice. Further, the increase of transmission loss of the respective coated optical fibers 1 of this optical fiber ribbon was measured. As a result, any increase in transmission loss caused by the above-mentioned fiber planaritys was not recognized.

Comparative Example

Figure 5C:
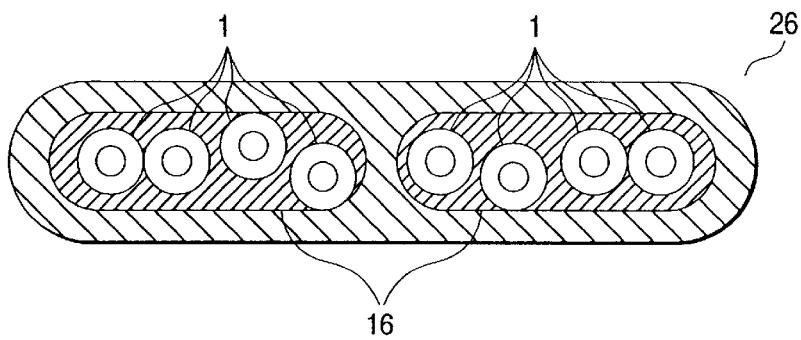

A separable optical fiber ribbon 26 was manufactured under the same conditions as those in the above-mentioned Example 1, except that the conventional collectively coating die device 2 shown in FIG. 8 was used. The cross-section of the separable optical fiber ribbon 26 is typically shown in FIG. 5C.

In this case, each of fiber planaritys Δa to Δf of coated optical fibers 1 included in the separable optical fiber ribbon 26 was considerably large to be within a range of from 33 μm to 45 μm.

It was difficult to mount these coated optical fibers 1 on V-grooves of a V-grooved board accurately, so that it was impossible to connect them by fusion splice.

Further, the distance Y between adjacent coated optical fibers 1 in the optical fiber ribbons 16 in the separable optical fiber ribbon 26 was large to be 360 μm. A portion of the eight coated optical fibers 1 came out from the V-grooves of the V-grooved board.

Incidentally, a separable optical fiber ribbon 26 was manufactured under the same conditions as those in Example 1 except that the line speed was reduced to a conventional level of 100 m/min. As a result, each of the fiber planaritys Δa to Δf could be reduced considerably to be within a range of from 18 μm to 23 μm.

Although the above embodiments and examples of the present invention have been described about the case where two 4-fiber ribbons 16 were manufactured and a separable optical fiber ribbon 26 having 8 coated optical fibers in total was manufactured, the present invention is not limited thereto, but may be applicable to the case where two 2-fiber ribbons 16 are manufactured and a separable optical fiber ribbon 26 having 4 coated optical fibers in total is manufactured, the case where two 8-fiber ribbons 16 are manufactured and a separable optical fiber ribbon 26 having 16 coated optical fibers in total is manufactured, and the case where two 12-fiber ribbons 16 are manufactured and a separable optical fiber ribbon 26 having 24 coated optical fibers in total is manufactured.

In the above-mentioned embodiment and examples of the present invention, a coated optical fiber having a primary coating layer, a secondary coating layer and a colored layer which were coated on a glass layer was used as a coated optical fiber 1. But the present invention is not limited thereto, but may be applicable to the case where a coated optical fiber 1 in which a primary coating layer is coated or a primary coating layer and a secondary coating layer are coated on a glass layer is used.

Further, although a die portion 10 having optical fiber passageways 14 provided to extend in the direction perpendicular to planes of a cylindrical body was used in the above-mentioned embodiment and examples of the present invention, the present invention is not limited to such a cylindrical shape so long as it is a columnar body having two parallel planes. That is, the present invention may be applicable to a die portion 10 having optical fiber passageways 14 provided to extend in the direction perpendicularly to the planes of a prism.

According to the present invention, used is a structure of a die portion where a branch portion in a conventional collectively coating die device is excluded so that unstable vortex flows of coating resin and disturbance of self-centering force caused by the vortex flows are suppressed. As a result, it is possible to reduce fiber planarity of optical fibers in a separable optical fiber ribbon conspicuously even when the coated optical fibers are coated with resin at a high line speed, and it is possible to mount the coated optical fibers on V-grooves of a V-grooved board accurately, so that high efficiency in the working of connection of optical fibers by fusion splice in manufacturing of a separable optical fiber ribbon can be realized.

Further, the productivity of a separable optical fiber ribbon is improved thus, so that the manufacturing cost can be reduced.

What is claimed is:

1. A coating die device for applying a coating resin to coated optical fibers to form optical fiber ribbons constituted by a plurality of said coating optical fibers that are arranged in a plane and parallel to one another, said device comprising:

a nipple;

a die;

a resin accumulation space between said nipple and said die;

said nipple having a plurality of optical fiber passageways, each passageway shaped like an ellipse, each of said plural optical fiber passageways having tapered sides portions; and said die having a plurality of optical fiber passageways, each passageway shaped like an ellipse, each optical fiber passageway of said die having a central axis, an inside tapered wall, an outside tapered wall terminating at a die outlet opening; and each of said tapered walls of each optical fiber passageway of said die forming a taper half angle with said axis.

2. A coating die device according to claim 1, wherein a first optical fiber passageway and a second optical fiber passageway in said die are provided, said passageways are adjacent to each other, said the passageways satisfy the following relationship:

$$P-W-L\times(\tan\theta 1+\tan\theta 2)\geq 0$$

where L designates a length of the tapered wall, θ1 designates the tapered angle formed with the inside tapered wall of said first optical fiber passageway, θ2 designates the tapered angle formed with the inside tapered wall said second optical fiber passageway, P designates a distance between the central axes of the first and second optical fiber passageways adjacent to each other, and W designates the width of said die outlet opening.

3. A coating die device according to claim 1 wherein, for each optical fiber passageway in said die, a taper half angle γ is formed between said central axis and said outside tapered wall and a taper half angle β is formed between said central axis and said inside tapered wall, taper half angles γ and β satisfy the relationship γ>β.

4. A method of manufacturing a separable optical fiber ribbon, comprising the steps of:

passing a group of coated optical fibers through one of said optical fiber passageways of a coating die device according to claim 1 to coat said group of coated optical fibers with a coating resin, and irradiating the coating resin with ultraviolet rays to thereby form said separable optical fiber ribbon at the outlet of the die wherein said coated optical fibers are arranged in a plane and parallel to one another.

5. An apparatus for manufacturing a separable optical fiber ribbon, the apparatus comprising a coating die device according to claim 1 for applying a coating resin to a group of optical fibers and a means for irradiating the coating resin at the outlet of the die to form said separable optical fiber ribbon.

6. The apparatus of claim 5, wherein the apparatus further includes a die for coating a plurality of optical fibers with a resin to form optical fiber ribbons and a means for curing the resin before the optical fiber ribbons pass through the coating die device.

* * * * *